May 6, 1952 R. W. PETER 2,595,698

ELECTRON DISCHARGE DEVICE AND ASSOCIATED CIRCUIT

Filed May 10, 1949 3 Sheets-Sheet 1

INVENTOR
ROLF W. PETER
BY William A. Zalesak
ATTORNEY

May 6, 1952 R. W. PETER 2,595,698

ELECTRON DISCHARGE DEVICE AND ASSOCIATED CIRCUIT

Filed May 10, 1949 3 Sheets-Sheet 2

Fig. 9a

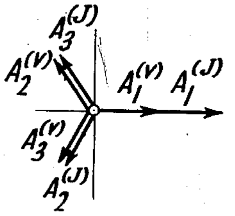

Fig. 9b

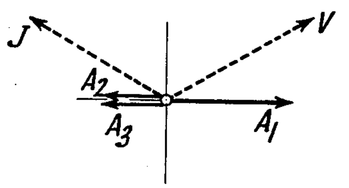

Fig. 10a

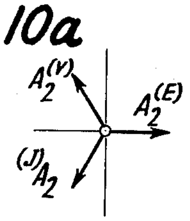

Fig. 10b

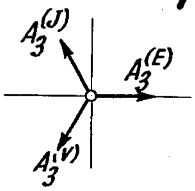

Fig. 10c

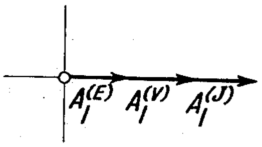

Fig. 10d

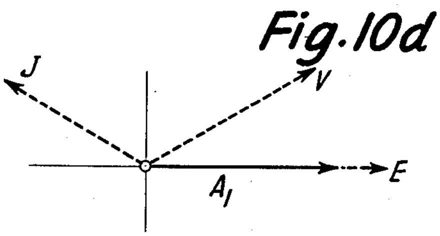

Fig. 11

| VARIATION NO | E | V | J | $3A_n$ | GAIN | VECTOR DIAGRAM |
|---|---|---|---|---|---|---|
| 1 | E | | | $E$ | 1 | FIG. 4 |
| 2 | | V | | $-iK\delta_n \cdot V$ | 1 | " 5 |
| 3 | | | J | $+iL\delta_n^2 \cdot J$ | 1 | " 6 |
| 4 | E | V | | $E-iK\delta_n \cdot V$ | 9/4 | " 7 |
| 5 | E | | J | $E+iL\delta_n^2 \cdot J$ | 9/4 | " 8 |
| 6 | | V | J | $-iK\delta_n \cdot V+iL\delta_n^2 \cdot J$ | 9/4 | " 9 |
| 7 | E | V | J | $E-iK\delta_n \cdot V+iL\delta_n^2 \cdot J$ | 9 | " 10 |

INVENTOR
ROLF W. PETER
BY
William A. Zalesak
ATTORNEY

ELECTRON DISCHARGE DEVICE AND ASSOCIATED CIRCUIT

Filed May 10, 1949 3 Sheets-Sheet 3

INVENTOR
ROLF W. PETER
BY William A. Zalesak
ATTORNEY

Patented May 6, 1952 2,595,698

UNITED STATES PATENT OFFICE 2,595,698

ELECTRON DISCHARGE DEVICE AND ASSOCIATED CIRCUIT

Rolf W. Peter, Princeton, N. J., assignor to Radio Corporation of America, a corporation of Delaware Application May 10, 1949, Serial No. 92,317

12 Claims. (Cl. 315—39)

This invention relates to electron discharge device and associated circuit, and more particularly to electron beam devices or tubes of the type known as traveling wave tubes.

In a traveling wave tube, an electron beam of given velocity is projected along a wave-guiding means, such as a helical transmission line, for example, and continuously interacts with an electromagnetic wave propagated along the wave-guiding means. The helix, or other wave-guiding means, is designed to slow down the wave so that it travels therealong at about the velocity of the electron beam. The axial electric fields set up on the helix impart velocity-modulation to the electron beam, and the latter, after a drift distance, becomes density-modulated. The density-modulated beam current, in turn, induces magnetic and electric fields in the helix and, if the induced fields are of such phase that they add to the original fields, the amplitude of the electromagnetic wave will increase exponentially. If the induced fields are in opposite phase to the original, the wave amplitude will decrease exponentially. If the induced fields are 90° out of phase with the original field the wave will neither increase nor decrease, but will travel unchanged along the helix (except for attenuation due to losses in the helix). All three of these effects occur in an actual traveling wave tube, and hence, it is convenient to consider the traveling wave in the tube as made up of three components or waves, of which one is a "growing" wave, another is an attenuated wave, and the third is an unchanged wave. One wave only, the growing wave, provides signal amplification. The amplitudes and phases of these waves depend upon the initial or input conditions.

The excitation of traveling waves in a traveling wave tube is usually accomplished by means of field input directly to the helix, that is, by coupling a transmission line or wave guide to the input end of the helix in a suitable manner. However, it is known that the waves may also be excited in the tube by pre-modulating the electron beam ahead of the helix, either by velocity-modulation by means of a gap or by density-modulation by means of a grid. Each of these three methods of excitation produce all three of the components or waves referred to above. Since the three waves are excited equally, only one-third of the input signal amplitude is useful for exciting the growing wave and hence for producing amplification. The output power is, therefore, only one-ninth of the optimum value for a given input signal, so that an initial loss of 9.6 db occurs.

In accordance with my invention, instead of exciting traveling waves by only one of the above-mentioned methods, i. e. field-input, velocity-modulation or density modulation, the input power is divided and applied, with appropriate amplitudes and phases, to three separate tube input systems using the three methods of excitation listed. It will be shown that by such multiple excitation it is possible to suppress the two useless waves and excite the growing wave only, thereby improving the net power gain of the tube by 9.6 db. As a modification, the excitation of the tube by optimum combinations of any two of the three methods of excitation results in a smaller gain improvement of 9/4, i. e. 3.5 db. For example, the signal may be applied to the helix, as usual, and also, with suitable amplitude and phase, to a control grid in the path of the beam between the cathode and the helix. The use of multiple excitation also reduces the noise factor.

Therefore, the principal object of the present invention is to provide a traveling wave amplifier tube having greatly improved gain. More specifically, the object of the invention is to provide means for eliminating the useless waves in a traveling wave tube. Another object is to provide a traveling wave tube in which the effect of the useful or growing wave component is accentuated relative to the useless components. Still another object is to provide a traveling wave tube with reduced noise factor.

These and other objects, features and advantages of the invention will be apparent from the following description. The novel features which I believe to be characteristic of my invention are set forth with particularity in the appended claims, but the invention itself will best be understood by reference to the following detailed description taken in connection with the accompanying drawing, in which:

Fig. 1 is a schematic view of a conventional traveling wave tube;

Figs. 2 and 4 through 10*d* are vector diagrams, and Fig. 3 is a graph, used in the description of my invention;

Fig. 11 is a table showing variations in the excitation of a traveling wave tube;

Investigations concerning the problem of continuous interaction between an electromagnetic field and an electron beam have been reported by J. R. Pierce, "Theory of the Beam-Type Traveling-Wave Tube," Proc. I. R. E., vol. 35, pp. 111–123, Feb. 1947; L. J. Chu and J. Jackson, "Field Theory of Traveling-Wave Tubes," M. I. T. Technical Report No. 38, April, 1947; C. Shulman and M. S. Heagy, "Small Signal Analysis of Traveling-Wave Tube," RCA Review, vol. 8, pp. 585–611, Dec. 1947; and others. The results of these investigations may be summarized as follows.

Figure 1:
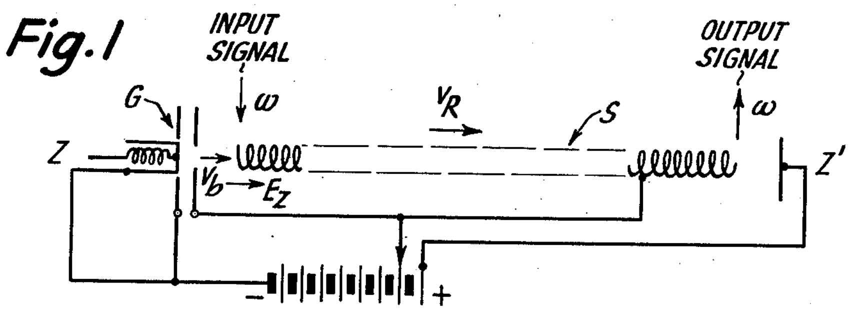
Figure 2:
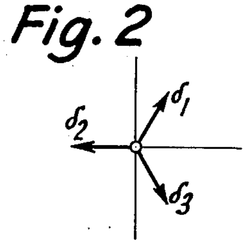
Figure 3:
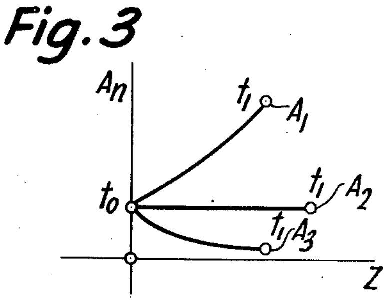

Fig. 1 shows a conventional traveling-wave tube comprising an electron gun G and a lossless wave guiding system S (helical conductor, wave guide containing dielectric material, capacitively-loaded wave guide or coaxial line, etc.) which is capable of carrying electromagnetic waves with angular frequency $\omega$, phase velocity $v_p$, and propagation constant $\Gamma_0$, with equiphase surfaces normal to a straight axis Z—Z′, and with a $z$-component $E_z$ of the electric field. If an electron beam from gun G is projected in the $z$-direction through the field of the wave guiding system with D. C. velocity $v_0=v_p$, the whole system will be able to carry three waves with different propagation constants in the direction of electron flow:

$$\Gamma_n=\Gamma_0+\delta_n \quad . \; . \; . (n=1, 2, 3) \qquad (1)$$

where $$\delta_n=|\delta|e^{i\frac{\pi}{3}(2n-1)} \qquad (1a)$$

as indicated by the vectors $\delta_1$, $\delta_2$ and $\delta_3$ in Fig. 2. In the opposite $(-z)$ direction, $\Gamma_0$ is unchanged. Of the three possible waves, $$E_n=A_n e^{i(\omega t-\Gamma_n z)} \qquad (2)$$

only the $E_1$ wave is amplified. The $E_2$ wave is transmitted without either amplification or attenuation, and the $E_3$ wave is attenuated. Fig. 3 shows the amplitudes and the wavefront positions $A_1$, $A_2$ and $A_3$ of the three waves $E_1$, $E_2$ and $E_3$ at the time $t_1$ after starting at $v=0$ and $t=t_0$.

In the case of a straight beam and small signals, the electrodynamic relations between the axial electric field $$E_z=\sum_{n=1}^{3}E_n=\sum_{n=1}^{3}A_n e^{i(\omega t-\Gamma_n z)} \qquad (3a)$$

the axial beam velocity $$v_z=v_0+\sum_{n=1}^{3}v_n e^{i(\omega t-\Gamma_n z)} \qquad (3b)$$

and axial current density $$J_z=J_0+\sum_{n=1}^{3}J_n e^{i(\omega t-\Gamma_n z)} \qquad (3c)$$

resulting from the equation of electron motion and the continuity equation (Shulman, Heagy, supra, p. 598) are the following:

$$v_n=-\frac{1}{iK}\cdot\frac{E_n}{\delta_n} \qquad (4a)$$

$$J_n=\frac{1}{iL}\cdot\frac{E_n}{\delta_n^2} \qquad (4b)$$

where $$K=v_0\frac{m}{q},\; L=\frac{v_0^3}{\omega J_0}\cdot\frac{m}{q}$$

and $m$ and $q$ are the mass and charge, respectively, of an electron.

According to my invention, multiple excitation is employed. We may arbitrarily define the three input quantities, field E, beam velocity $v$ and current density J of a generalized traveling-wave tube at $z=0$ as follows:

$$E=|E| \qquad (5a)$$

$$x=|v|\,e^{i\psi} \qquad (5b)$$

$$J=|J|\,e^{i\varphi} \qquad (5c)$$

where $\psi$ and $\varphi$ are the phase angles of the velocity modulation and density modulation, respectively, with respect to the electric field E. Combining Equations 2, 4 and 5, we obtain the following Equations for the quantities E, $v$ and J:

$$E=A_1+A_2+A_3 \qquad (6a)$$

$$v=-\frac{1}{iK\delta_1}\cdot A_1-\frac{1}{iK\delta_2}\cdot A_2-\frac{1}{iK\delta_3}\cdot A_3 \qquad (6b)$$

$$J=\frac{1}{iL\delta_1^2}\cdot A_1+\frac{1}{iL\delta_2^2}\cdot A_2+\frac{1}{iL\delta_3^2}\cdot A_3 \qquad (6c)$$

The general solution of $A_n$ is a linear superposition of the three partial solutions which result from excitation by any one of the input quantities E, $v$ and J. Using the values of $\delta_n$ from Equations $1a$ and 6, the solution of $A_n$ gives:

$$A_1=\frac{1}{3}\left(E+iK|\delta|e^{-i\frac{2\pi}{3}}\cdot v+iL|\delta|^2e^{i\frac{2\pi}{3}}\cdot J\right) \qquad (7a)$$

$$A_2=\frac{1}{3}(E+iK|\delta|v+iL|\delta|^2\cdot J) \qquad (7b)$$

$$A_3=\frac{1}{3}\left(E+iK|\delta|e^{i\frac{2\pi}{3}}\cdot v+iL|\delta|^2e^{-i\frac{2\pi}{3}}\cdot J\right) \qquad (7c)$$

Since only the $A_1$ wave is amplified, the phases and amplitudes of $|v|e^{i\psi}$ and $|J|e^{i\varphi}$ must be chosen such that $A_1$ becomes largest. The optimum phase is reached if the three partial vectors of $A_1$ in $(7a)$ are of the same phase, say real. This leads to the optimum-phase conditions:

$$E=|E| \qquad (8a)$$

$$v=|v|e^{i\frac{\pi}{6}} \qquad (8b)$$

$$J=|J|e^{i\frac{5\pi}{6}} \qquad (8c)$$

The wave amplitudes then become:

$$A_1=\frac{1}{3}(|E|+K|\delta|\,|v|+L|\delta|^2\cdot|J|) \qquad (9a)$$

$$A_2=\frac{1}{3}\left(|E|+K|\delta|\,|v|e^{i\frac{2\pi}{3}}+L|\delta|^2|J|e^{-i\frac{2\pi}{3}}\right) \qquad (9b)$$

$$A_3=\frac{1}{3}\left(|E|+K|\delta|\,|v|e^{-i\frac{2\pi}{3}}+L|\delta|^2|J|e^{i\frac{2\pi}{3}}\right) \qquad (9c)$$

The smaller $A_2$ and $A_3$ are in Equation 6, the smaller the input power loss will be. Therefore, the optimum-amplitude condition, for the special case of Equation 8, is $$|E|=K|\delta|\cdot|v|=L|\delta|^2\cdot|J| \qquad (10)$$

in which (9) becomes $A_1=|E|$, $A_2=0$ and $A_3=0$. Combining Equations 8 and 10 we obtain the optimum values of the three input quantities:

$$E=|E| \qquad (11a)$$

$$v=\frac{|E|}{K|\delta|}\cdot e^{i\frac{\pi}{6}} \qquad (11b)$$

$$J=\frac{|E|}{L|\delta|^2}\cdot e^{i\frac{5\pi}{6}} \qquad (11c)$$

Therefore, if the input conditions of Equations 6 are matched correctly, by appropriate choice of phase and amplitude of the three input quantities, as indicated in Equations 11, a traveling wave tube can be excited by applying the input signal to three different input systems in such manner that only the amplified wave is excited, the other two waves being suppressed. As a result, there is no loss of input power due to exciting the two useless waves.

Figures 6, 7A, 8A:
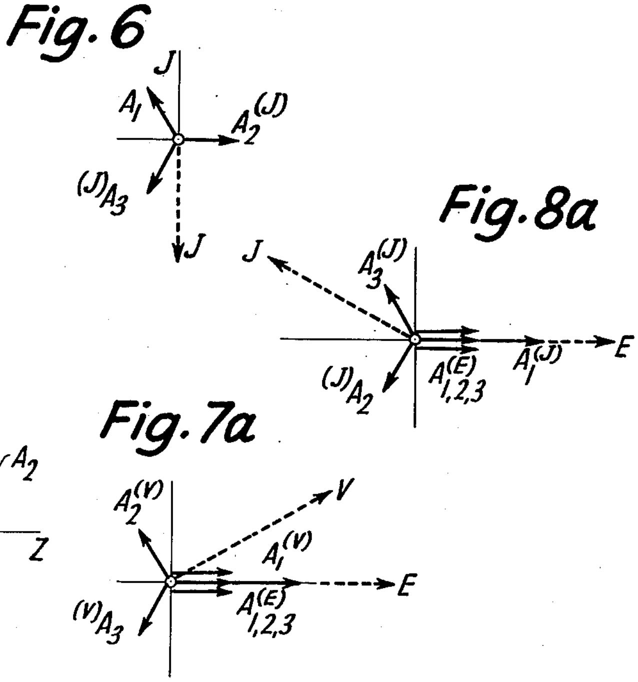
Figure 4:
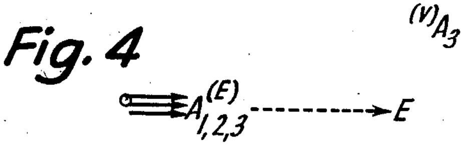
Figure 5:
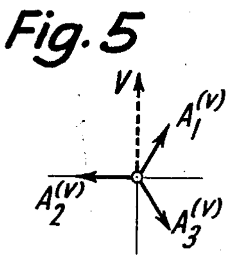

Figs. 4, 5 and 6 are vector diagrams for separate excitation by pure field input, pure velocity-modulation and pure density-modulation, respectively. The solid arrow vectors represent the amplitudes and phases at the input of the three waves set up by each method of excitation when used separately. The dash line arrows represent the relative phases of the three separate input quantities. (The $A_1^{(v)}$ vector represents the $A_1$ wave excited by velocity-modulation, $A_1^{(E)}$ represent the $A_1$ wave excited by field input, etc. The three A quantities for each input are equal in magnitude. For convenience, all nine vectors are shown to the equal in Figs. 4, 5 and 6, particularly since the amplitudes are made equal in multiple excitation.

Figure 8B:
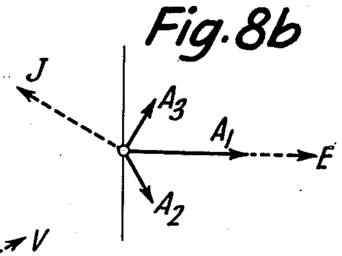
Figure 7B:
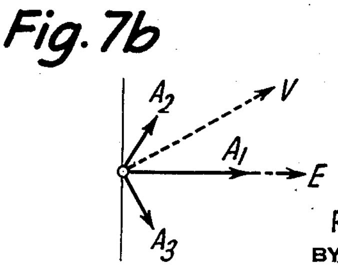

Fig. 7*a* shows the waves excited by the optimum combination of field input and velocity-modulation, when the phase of the velocity modulation input is adjusted to rotate the A and $v$ vectors of Fig. 5 clockwise by $\pi/3$ radians, to a position where $v$ is $\pi/6$ radians from E, in accordance with Equation 11*b*, to make the $A_1$ vectors coincide. Fig. 7*b* shows the vector sums of the corresponding A vectors of Fig. 7*a* by the solid arrows $A_1$, $A_2$ and $A_3$. Figs. 8*a* and 8*b* similarly show the waves excited by the optimum combination of field input and density-modulation; Figs. 9*a* and 9*b* show the optimum combination of velocity-modulation and density-modulation. In each of the combinations of Figs. 7, 8 and 9, the $A_1$ quantity which produces amplification is doubled, and the useful output power is increased by 9/4, relative to single input excitation.

Figs. 10*a*, 10*b* and 10*c* show the $A_1$, $A_2$ and $A_3$ waves, respectively, excited by the optimum combination of all three methods of excitation. The three $A_2$ waves cancel each other as shown in Fig. 10*a*, and the three $A_3$ waves also cancel each other as shown in Fig. 10*b*, while the three $A_1$ waves add together as shown in Fig. 10*c* to give the resultant vector $A_1$ three times as long, as shown in Fig. 10*d*. Thus, all of the signal amplitude and power is useful for amplification and the power gain is increased nine times or by 9.6 db.

In the table of Fig. 11 the seven possibilities of exciting traveling waves in a traveling-wave tube are summarized. In this table, $A_n$ represents the amplitude of a wave at the input end of the wave guiding system. The gain is indicated relative to that obtained by single input excitation. Variations 4 through 7 are employed in my invention.

The invention may be carried out by use of various combinations of input systems each of which may be conventional, per se. For purposes of illustration only, I have shown in Figs. 12 to 16, inclusive, several structural embodiments which may be used. However, it should be understood that the invention itself is not limited to the particular embodiments shown, but may be applied to traveling wave tubes utilizing other types of wave guiding systems, as well as other types of input and output systems.

Figure 12:
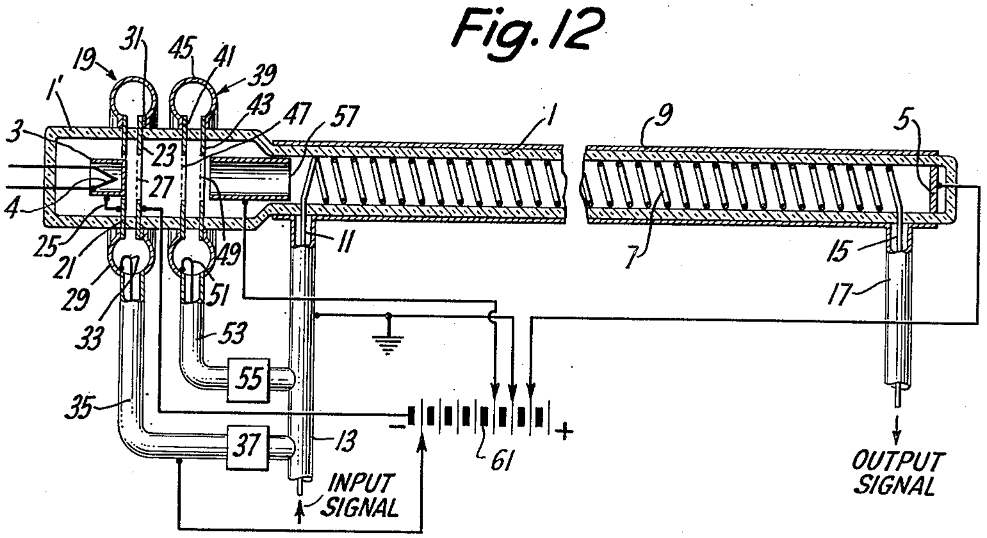
Fig. 12 is a side elevation view partly in axial section, of a traveling wave tube embodying my invention.

In the embodiment shown in Fig. 12, the tube comprises an elongated glass envelope 1 having an enlarged portion 1' at one end in which is suitably mounted an electron supplying means or cathode 3 provided with a heater 4. A collector 5 is mounted in the opposite end of the envelope. A metal helical conductor or helix 7 of suitable diameter and pitch extends along the major portion of the envelope between the cathode and collector. The helix 7 may engage the envelope 1, as shown, or be spaced therefrom by suitable insulating supports. That part of the envelope containing the helix 7 is surrounded by a conducting shield 9. The cathode end of the helix is connected to the inner conductor 11 of a coaxial transmission line 13 by which the input signal is applied directly to the helix. Similarly, the collector end of the helix 7 is connected to the inner conductor 15 of an output coaxial line 17. The structure described thus far is an example of a conventional traveling wave tube. The type of input system described is known as a field-input system. The signal applied to the helix 7 excites traveling waves thereon which travel with an axial phase velocity determined by the structure of the helix, and surrounding elements. The velocity of the electron beam is adjusted to substantially the wave velocity. As explained above, this manner of excitation when used alone produces an attenuated and an unchanged wave as well as a growing wave.

In accordance with my invention, in order to increase the gain by eliminating or reducing the effect of one or both of the useless waves, I apply the signal to the beam as well as the helix, either by density-modulation or velocity-modulation, or both.

The means for density-modulating the beam comprises a cavity resonator 19 which includes a pair of flat rings 21 and 23 sealed through the envelope 1 adjacent the cathode 3. The ring 21 lies in the plane of the active cathode face and is connected thereto, as shown at 25. A control electrode or grid 27 is mounted over the aperture in the ring 23 in front of the cathode. The resonator 19 is completed by a toroidal ring 29 connected directly to ring 21 and capacitively coupled to ring 23, through insulation 31 which permits the application of a negative bias to the grid 27. The signal is applied to the resonator 19 by means of a coupling loop 33 forming a continuation of a coaxial line 35 connected to the line 13. Means for insulating the resonator 19 from line 13 and for adjusting the relative phase and amplitude of the input to the resonator are interposed in the line 35, as indicated schematically by the box 37.

The means for velocity-modulating the beam comprises a cavity resonator 39 which includes a pair of flat rings 41 and 43 sealed through the envelope between the cathode 3 and helix 7 and connected by a toroidal ring 45. Two control electrodes or grids 47 and 49 are mounted over the apertures in the rings 41 and 43, respectively, in the path of the beam. The signal is applied to resonator 39 by means of a coupling loop 51, coaxial line 53, and phase and amplitude adjusting means 55. A drift tube 57 is interposed between the resonator 39 and helix 7, as shown.

To operate the tube shown in Fig. 12 as an amplifier, the grid 27 is connected to the lowest (negative) potential point of a direct-current source 61; the cathode and resonator 19 are connected to a slightly higher potential; and the shield 9, helix 7, and collector 5 coaxial lines 13, 53, resonator 39 and are connected to high positive potentials. The shield 9 and connected elements are grounded. The drift tube 57 may be maintained at the same positive potential as the resonator 39, or a less positive one as shown.

For optimum results, the phase and amplitude of the signal applied between the cathode 3 and grid 27 are adjusted, in accordance with Equation 11c above, and the phase and amplitude of the signal applied between the grids 47 and 49 are adjusted, in accordance with Equation 11b above, so that the useless $A_2$ and $A_3$ waves, which would be set up by each of the three different methods of excitation if used separately are cancelled, and the three $A_1$ or growing waves which are set up add together.

In other words, the phases and amplitudes are adjusted so that the three $A_2$ waves cancel each other and the three $A_3$ waves also cancel each other, leaving only the $A_1$ waves. Since the entire input power is available for excitation of the $A_1$ waves, the amplitude of the $A_1$ wave is tripled and, therefore, the net power gain is increased nine-fold, or by 9.6 db. For example, if the parameters of a given tube are so chosen that the gain with single input excitation is 10 db, then the gain of that tube with multiple input excitation as described above will be 10+9.6 or 19.6 db.

If desired, the signal may be applied to any two only of the three input systems shown in Fig. 12. For example, the velocity modulation system may be omitted, or not used, and the signal applied to the helix 7 and the grid 27 only. When the relative phases and amplitudes are properly adjusted the conditions shown in Figs. 8*a* and 8*b* occur. The $A_1$ vector of the density modulation (J) adds to the $A_1$ vector of the field input (E) and the net power gain is increased in the ratio 9/4, or by 3.5 db.

Similarly, the signal may be applied to the grids 47 and 49 and the helix 7 only, under the conditions shown in Figs. 7*a* and 7*b*, or to the grid 27 and grids 47 and 49 only, under the conditions of Figs. 9*a* and 9*b*, with similar results.

Figures 13, 14, 15:
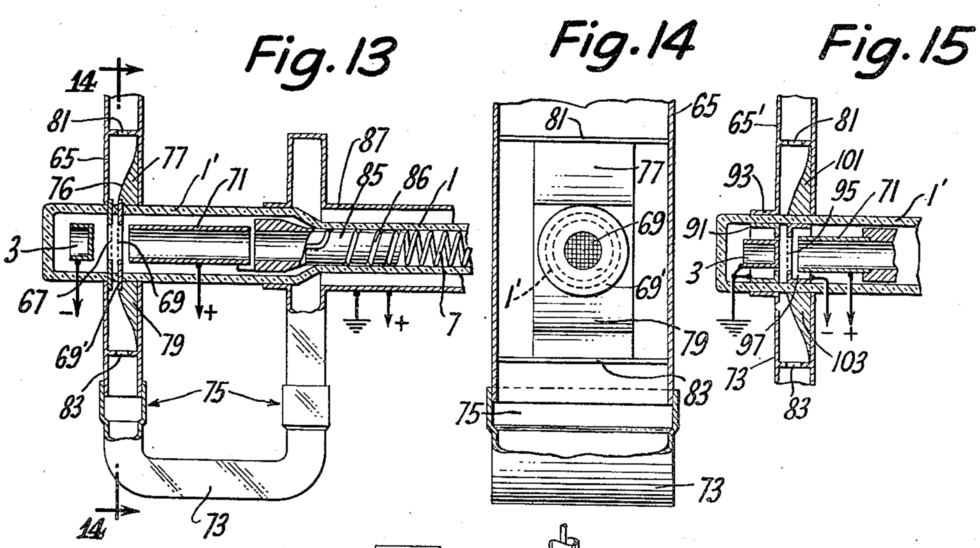
Figs. 13, 15 and 16 are fragmentary views similar to Fig. 12 and showing modifications of the invention.
Fig. 14 is a transverse section view taken on line 14—14 of Fig. 13.

The parallel-input system shown in Fig. 12 has a rather narrow frequency bandwidth. The frequency bandwidth can be widened by use of the series-input modifications shown in Figs. 13 to 15, if the length of the coupling waveguide is adjusted so that the delay in the guide is the same as in the drift tube for waves and electrons, respectively, independent of frequency. In Fig. 13, the signal is first applied to pre-modulate the beam by means of an input waveguide 65 coupled to a pair of velocity modulating electrodes or grids 67 and 69 mounted between the cathode 3 and drift tube 71. A continuation of the waveguide 65 forms a coupling waveguide 73 between the grids 67 and 69 and the field input system. The waveguide 73 is provided with means 75 for adjusting its length, to adjust the relative phase of the input to the helix. The amplitude of the helix input is determined by a waveguide ridge 76 having tapered ends 77 and 79 which merge into the surfaces of the waveguide and the grid ring 69', as shown. Irises 81 and 83 are provided in the waveguide on each side of the grids to increase the Q of the waveguide by causing partial reflection of the waves traveling therethrough. Fig. 13 shows a helix input system different from that of Fig. 12 and suitable for use with a waveguide. The helix 7 is terminated by a slotted helix transition member 85 such as that disclosed in Fig. 2 of a co-pending application of Frederick C. F. O. Lund, Serial No. 15,128, filed March 16, 1948, and assigned to the same assignee as the instant application. Beyond the end of the slot 86, the member 85 increases in diameter as shown. In this embodiment, the shield 87 is spaced from the envelope.

Fig. 15 shows a modification of Fig. 13 using grid-modulation in place of velocity-modulation. The end planes of the cathode 3 and a flanged ring 91 are located in the plane of one wall of the waveguide 65', as shown. The ring 91 is connected to the cathode and is capacitively coupled to the waveguide 65' by means of a flange 93 on the waveguide. The control electrode or grid 95 is mounted near the cathode on a cup-shaped support 97 which has flat sides and serves as a continuation within the envelope of the tapered ridge formed by the ridge members 101 and 103. The grid 95 is capacitively coupled to the waveguide by the end walls of support 97. The remainder of the structure may be the same as in Figs. 13 and 14.

Figure 16:
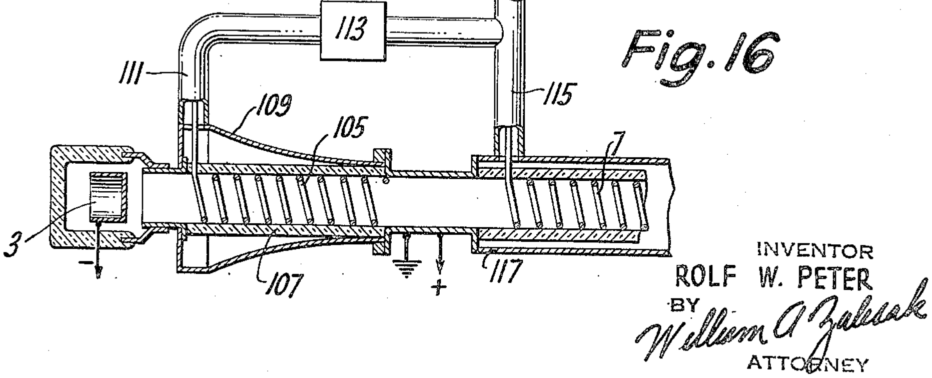

In Fig. 16 is shown a further modification of Fig. 12, in which a conventional field input to the helix is combined with an aperiodic beam modulation input system such as disclosed in Fig. 12 of a co-pending application by L. S. Nergaard entitled Electron Discharge Device and Circuit, Serial No. 69,634, filed January 7, 1949, and assigned to the same assignee as the instant application. The aperiodic input system comprises a control helix 105 of uniform diameter and pitch closely surrounded by a glass tube 107 which, in turn, is surrounded by an exponential metal cone 109 which varies in diameter along the helix 105 in accordance with the relation.

$$b/a=e^{\frac{Z_0}{60}\frac{vx}{cL}}$$

where $b$ is the maximum diameter of the cone 109, $a$ is the diameter of the helix 105, $Z_0$ is the surge impedance of the tapered cone at $x=L$, $v/c$ is the ratio of the phase velocity along the helix to the phase velocity in free space, and L is the length of the cone. The helix 105 is proportioned so that the phase velocity along the helix is approximately equal to the beam velocity.

The signal is applied in parallel to the helix 105 and cone 109 by means of a coaxial line 111 and phase and amplitude adjusting means 113, and to the helix 7 by means of a coaxial line 115 connected to the helix 7 and surrounding shield 117.

The beam coupling means of Fig. 16 displays a relatively constant impedance to the beam, appropriate for extraction of energy therefrom by the beam, and presents a resistance to the input line 111 which, if properly matched by the input line, prevents the occurrence of reflections. The result is an input system which has a bandwidth limited only by the electronic bandwidth of the tube. This input system produces a mixture of velocity-modulation and initial density-modulation, and hence, differs from either velocity or grid-modulation, per se.

In addition to producing a substantial increase in power gain in the tube, the use of multiple excitation in a traveling wave tube as described herein also reduces the noise factor. Since the noise in a beam tube is due to shot noise in the beam, the only traveling waves excited by the shot noise are those resulting from a density modulation of the beam by the noise. This constitutes only a single input excitation, hence, there is a 9.6 db loss in noise due to excitation of useless $A_2$ and $A_3$ noise waves, as in a conventional traveling wave tube. Since, there is no 9.6 db loss in the signal if multiple input excitation is employed, the input signal-to-noise ratio is higher than in single input tubes. If desired, the noise factor of a traveling wave tube can be lowered for a given gain by using a lower beam current with multiple excitation, as shown by the following example:

| Input | Gain (db) | Beam Current | Noise Factor |
|---|---|---|---|
| Single | 10 | $I_0$ | F |
| Multiple | 10 | $I_0/8$ | $F\times\frac{10}{10\times9.6}=F/2$ (approx.) |

It will be understood that each of the tubes should be provided with suitable focusing means, such as an electromagnet coaxial with and surrounded by the wave-guiding structure, for providing an axial magnetic field for preventing the beam from spreading and being collected by the wave-guiding structure.

Each of three different input systems described may be considered either as a means for modulating the beam or as a means for exciting traveling waves along the wave guiding system, since both results are produced by each, either directly or indirectly.

Although several specific embodiments of the invention have been described for purposes of illustration, it will be apparent that many variations may be made in the particular structures employed without departing from the scope of the invention as defined in the appended claims.

I claim:

1. An electron discharge device comprising means for supplying and directing a beam of electrons along a given path, means for collecting said electrons, waveguiding means positioned between said electron supplying means and said collecting means and extending along said path, at least two separate means for exciting traveling waves along said waveguiding means in accordance with an electrical signal, and means for extracting amplified electrical energy from said waveguiding means.

2. An electron discharge device comprising means for supplying and directing a beam of electrons along a given path, means for collecting said electrons, waveguiding means positioned between said electron supplying means and said collecting means and extending along said path, at least two separate means for modulating said beam in accordance with an electrical signal, and means for extracting amplified energy from said waveguiding means.

3. An electron discharge device comprising an elongated waveguiding structure, means for supplying and directing a beam of electrons along said structure for interaction therewith, means coupled to said waveguiding structure for exciting traveling waves therealong in accordance with an electrical signal, means coupled to the beam for pre-modulating the beam by said signal prior to interaction with said structure, and means for extracting amplified electrical energy from said wave-guiding structure.

4. An electron discharge device according to claim 3, wherein said pre-modulating means includes a control electrode adjacent said electron supplying means, and means for applying said signal between said electron supplying means and said control electrode.

5. An electron discharge device according to claim 4, wherein said pre-modulating means further includes a pair of additional control electrodes spaced along the beam path between said first mentioned control electrode and said waveguiding structure, and means for establishing an electric field between said additional control electrodes varying in accordance with said signal.

6. An electron discharge device according to claim 3, wherein said pre-modulating means includes a pair of control electrodes spaced along the beam path between said electron supplying means and said waveguiding structure, and means for establishing an electric field between said control electrodes varying in accordance with said signal.

7. An electrical system comprising an elongated waveguiding structure, means for supplying and directing a beam of electrons along said structure for interaction therewith, at least two separate means for exciting traveling waves along said structure, means for applying an electrical signal separately to said two exciting means and including means for adjusting the relative phases and amplitudes of the signal as applied to each exciting means, and means for extracting amplified electrical energy from said waveguiding structure.

8. An electrical system comprising an elongated waveguiding structure, means for supplying and directing a beam of electrons along said structure for interaction therewith, at least two separate means for exciting traveling waves along said structure, means for applying an electrical signal separately to said two exciting means with such relative phases and amplitudes that the useful waves excited by each exciting means add together to give increased amplification, and means for extracting amplified electrical energy from said structure.

9. An electrical system comprising an elongated waveguiding structure adapted to transmit electromagnetic waves therealong at a small fraction of the velocity in free space, means for supplying and directing a beam of electrons along said structure at substantially the velocity of the waves thereon, at least two separate means of different kind for exciting traveling waves along said structure, means for applying an electrical signal separately to said two exciting means with such relative phases and amplitudes that the useful waves excited by each exciting means add together to give increased amplification, and means for extracting amplified electrical energy from said waveguiding structure.

10. An electrical system comprising an elongated waveguiding structure adapted to transmit electromagnetic waves therealong at a small fraction of the velocity in free space, means for supplying and directing a beam of electrons along said structure at substantially the velocity of the waves thereon, means coupled to said structure for exciting traveling waves therealong in accordance with an electrical signal, means adjacent said electron supplying means for modulating the charge density of said beam, means disposed in the beam path between said electron supplying means and said structure for modulating the velocities of the electrons in said beam, means for applying said signal separately to said charge density modulating means and said velocity modulating means with such phases and amplitudes relative to said wave exciting means that all the useful waves set up along the beam and waveguiding structure add together to give increased amplification and all the useless waves which would be set up along the beam and waveguiding structure by each exciting or modulating means if used separately are suppressed, and means for extracting amplified electrical energy from said waveguiding structure.

11. An electrical system comprising an elongated waveguiding structure, means for supplying and directing a beam of electrons along said structure for interaction therewith, means coupled to said structure for exciting traveling waves therealong in accordance with an electronic signal, means adjacent said electron supplying means for modulating the charge density of said beam, means for applying said signal to said charge density modulating means and including means for adjusting the phase and amplitude of the signal to satisfy the relation $$J=\frac{|E|}{L|\delta|^2}\cdot e^{i\,5\pi/6}$$

where J is the alternating current density of the beam, |E| is the amplitude of the axial electric field applied to the waveguiding structure, $$L=\frac{v_0^3}{\omega J_0}\cdot\frac{m}{q}$$

$v_0$ is the phase velocity of the waves along the structure, $\omega$ is the signal frequency, $J_0$ is the direct-current beam current density, $m$ and $q$ are the mass and charge, respectively of an electron $|\delta|$ is $$\frac{2}{\sqrt{3}}$$

times the logarithmic increment of the growing wave, and $e^{i5\pi/6}$ indicates a phase difference of $5\pi/6$ radians between the charge density modulation input and the electric field applied to the waveguiding structure, and means for extracting amplified electrical energy from said structure.

12. An electrical system comprising an elongated waveguiding structure, means for supplying and directing a beam of electrons along said structure for interaction therewith, means coupled to said structure for exciting traveling waves therealong in accordance with an electrical signal, means disposed in said path between said electron supplying means and said structure for modulating the velocities of the electrons in said beam, means providing a field-free drift space between said modulating means and said structure, means for applying said signal to said velocity modulating means and including means for adjusting the phase and amplitude of the signal to satisfy the relation $$v=\frac{|E|}{K|\delta|}\cdot e^{i\frac{\pi}{6}}$$

where $v$ is the axial electron velocity, |E| is the amplitude of the axial electric field applied to the structure, $$K=v_0\frac{m}{q}$$

$V_0$ is the phase velocity of the waves along the structure, $m$ and $q$ are the mass and charge, respectively, of an electron, $|\delta|$ is $$\frac{2}{\sqrt{3}}$$

times the logarithmic increment of the growing wave, and $$e^{\frac{i\pi}{6}}$$

indicates a phase difference of $\pi/6$ radians between the velocity modulation input and the electric field applied to the waveguiding structure, and means for extracting amplified electrical energy from said structure.

ROLF W. PETER.

REFERENCES CITED

The following references are of record in the file of this patent:

UNITED STATES PATENTS

| Number | Name | Date |
|---|---|---|
| 2,064,469 | Haeff | Dec. 15, 1936 |
| 2,409,992 | Strobel | Oct. 22, 1946 |
| 2,516,944 | Barnett | Aug. 1, 1950 |